US006287508B1

(12) United States Patent
Stripe

(10) Patent No.: US 6,287,508 B1
(45) Date of Patent: Sep. 11, 2001

(54) METHOD FOR MANUFACTURING CURVED THERMOPLASTIC TUBES

(75) Inventor: Stanley E. Stripe, Lexington, TN (US)

(73) Assignee: Dayco Products, Inc., Dayton, OH (US)

( * ) Notice: Subject to any disclaimer, the term of this patent is extended or adjusted under 35 U.S.C. 154(b) by 0 days.

(21) Appl. No.: 09/258,474

(22) Filed: Feb. 26, 1999

(51) Int. Cl.7 ....................................................... B29C 49/46
(52) U.S. Cl. ............................................. 264/570; 264/573
(58) Field of Search ................................... 72/57, 58, 59, 72/60, 61, 62, 128, 369, 54; 264/528, 531, 534, 535, 570, 573

(56) References Cited

U.S. PATENT DOCUMENTS

| 203,842 | * | 5/1878 | Leland | 72/369 |
| 3,753,635 | * | 8/1973 | Barnett | 425/162 |
| 3,884,612 | * | 5/1975 | Parmann | 425/384 |
| 4,428,900 | * | 1/1984 | Riley et al. | 264/526 |
| 4,499,045 | * | 2/1985 | Obsomer | 264/532 |
| 5,202,078 | * | 4/1993 | Moore | 264/527 |
| 5,500,257 | * | 3/1996 | Krause et al. | 427/487 |
| 5,516,479 | * | 5/1996 | Schimmelpfennig et al. | 264/322 |

* cited by examiner

Primary Examiner—Jan H. Silbaugh
Assistant Examiner—Suzanne E. McDowell
(74) Attorney, Agent, or Firm—Joseph V. Tassone

(57) ABSTRACT

A method for manufacturing a curved tubular article wherein said tubular article is composed of a thermoplastic, thermosetting, elastomeric, or a hybrid construction of an elastomer and a thermoplastic or thermosetting material, the tubular article having a predetermined three-dimensional serpentine configuration wherein the article exhibits a circular cross-section uniformly throughout the length of the article, the method comprising: providing a formable thermoplastic tubular preform; securing the ends of the preform to respective coupling members such that the preform is longitudinally interposed between the coupling members which are tensionally mounted on opposite sides of a base such that elongational tension is capable of being placed on the preform; filling the hollow interior of the preform with a heated fluid, the fluid being at a pressure sufficient to support the preform; applying mechanical pressure to the exterior surface of the fluid-containing preform at one or more predetermined areas along the length of the fluid-containing preform such that the preform is shaped into a predetermined three-dimensional serpentine configuration; replacing the heated fluid in the preform with a cooled fluid whereby the predetermined three-dimensional serpentine configuration of the preform is set; and removing the cooled fluid from the preform such that it is completely removed.

15 Claims, 3 Drawing Sheets

METHOD FOR MANUFACTURING CURVED THERMOPLASTIC TUBES

BACKGROUND OF THE INVENTION

The present invention relates to a method for the manufacture of thermoplastic tubes and particularly to the manufacture of curved thermoplastic tubes which exhibit a consistent wall gauge and circular cross-section.

Typically, the manufacture of fuel filler tubes, fuel line tubes, radiator coolant tubes, power steering tubes, etc. used in the automotive industry, for instance, involves the steps of preparing a length of uncured, flexible tube consisting of an inner tube, an outer cover, and a reinforcement positioned therebetween, and then loading the green preform onto a rigid mandrel which may be made of metal, plastic or rubber. The mandrel has a general shape which corresponds to the desired tube configuration. The length of tube mounted on the mandrel is then cured in an open steam autoclave and then removed from the mandrel as a finished product. While this rigid mandrel process has proved largely satisfactory, three-dimensional serpentine configurations having extremely acute bends, are virtually impossible to build on rigid, curved mandrels. Not only is it difficult to load and unload the tube element with these prior methods, but also problems with respect to hot tear and creasing at the inside surface of the bends arise which are detrimental to performance characteristics, such as fluid flow, and eventually lead to premature failure of the tube in operation. Various methods have been proposed to address these concerns.

The use of granular material such as sand as a flexible mandrel material in the production of curved tubular articles, is disclosed in U.S. Pat. No. 1,877,628 to Replogle. However, the use of sand as a mandrel core in the preparation of curved tube is not satisfactory inasmuch as it produces a tough, stippled or porous interior surface upon curing and the sand particles lodge within such pores where they are virtually impossible to totally remove by flushing after cure. The occurrence of even residual amounts of such particulate material is highly undesirable in, for example, fuel filler tubes where the particles may foul the fuel pump or other intricate orifices in the fuel line system of an automobile.

U.S. Pat. No. 3,753,635 to Barnett describes an apparatus for precision bending of thermoplastic conduit comprising a rotatable means having a multiplicity of locations and a plurality of stations, each station having a pressurizing means for establishing a pressure differential across the walls of a segment of a conduit to be bent, the higher pressure being on the interior of the conduit, a clamping means for each end of the segment of conduit, a jig means having an interior wall for effecting an elbow having a desired finish, an automatic bending means connected with a movable portion of the clamping means and a stop to limit the degree of bending. The rotary device moves through a loading location, a heating location, a heating and bending location and a cooling location when the pipe is cooled by externally applying cool air to the assembly and then subjecting the pipe to a cooling bath or spray of cool water.

U.S. Pat. No. 3,021,871 to Rodgers describes an extruded spiral shaped length of tubing, preferably of nylon, wrapped around a mandrel of a size to determine the desired internal diameter of a coil of tubing. The tubing is wrapped at room temperature and then has live steam circulated through the tubing. Cold water is then passed through the tubing to fix the thermoplastic material in the desired coil shape.

U.S. Pat. No. 3,826,288 to Cooper et al. Teaches a thermoplastic article of preformed shape by wrapping a length of tubing or tube stock such as nylon around one mandrel then in the opposite direction around another mandrel spaced from the first in a figure eight configuration. The fixture containing the mandrels and the tube is then suitably heated until the tubing assumes the shape of the mandrels and is then cooled to retain that shape. Heated fluid may be circulated through the tube in the heating step and cool fluid may be used in the cooling step.

U.S. Pat. No. 3,992,505 to Tally describes an automotive radiator tube of elastomeric material by filling the interior of an uncured length of elastomeric tubing with a flowable incompressible material, capping the ends of the tubing and training the thus filled tubular element about discrete unconnected support means disposed in a configuration to represent the final shape of the article and vulcanizing tube. The material in the tube may be a water soluble salt or water. This is a thermosetting process and cooling is not necessary as the vulcanization fixes the final shape.

U.S. Pat. No. 4,218,420 to Jacob et al. Describes a method of curing a tubular tube in a spiral groove cut in mating halves of press plates. The unshaped tube is disposed in one spiral groove of the mold halves, the mold closed, and a heating step applied while the tube is confined to the spiral groove. The finished tube has a precision defined exterior. A hot fluid may be passed through the tube during the heating step.

In U.S. Pat. No. 4,144,622 to Stroupe there is described a method of forming an article of tortuous shape utilizing a metallic mold of two or more separate parts having an interior cavity of the desired shape of the finished article. The article to be shaped is built upon a tube former. The green article and the tube former are placed in the cavity, the mold parts closed and secured and the tube former is inflated to approximately 50 psi gauge. The article is then heat-cured in the mold or may be removed from the mold and post treated. These articles are made of an overlapped sheet element, a surrounding rib-knit fabric and congealing viscous resin.

In U.S. Pat. No. 3,859,408 to Voss et al., the patentees advance a tubular carcass through a generally tubular cross-sectional mold, seal both ends, one with a floating seal and pinch rolls, the other with a plug, internally pressurize the tube through the plug end, setting the carcass in the mold portion with externally heating coils, relieving the pressure, advancing a new section of carcass through the mold, severing the vulcanized portion from the green portion, sealing the open end and repeating the process. The pressurizing means preferably also comprises a heating means.

Canadian Pat. No. 1,042,642 to Barbier et al. Discloses a congealable fluid introduced into a green tube in a fluid form. The congealable fluid is converted to a solid form to complete the tube construction on a solid mandrel. The congealed fluid is then reconverted to fluid form during the vulcanization process.

Tubes manufactured to have a three-dimensional serpentine configuration typically are plagued with a constrictive diameter at the point of the bend, particularly when the bend is at an acute angle. The constrictive diameter is due to wrinkling of the smaller inner circumference of the bend which prevents the inner diameter of the tube from being circular. Therefore, such tubular structures exhibit circular diameters at locations where the tube is straight, but in areas containing bends, especially acute bends, they exhibit oval shapes. While the total areas may be the same or very similar, the particular shape of the tube at the bends drastically affects the performance of the tube. Therefore, a need exists in the industry for a method of manufacturing thermoplastic tubes having various three-dimensional serpentine configurations including even extremely acute bends which exhibit a consistent wall gauge and circular cross-section uniformly throughout their entire length, without the difficulties encountered in the previous prior art.

SUMMARY OF THE INVENTION

In accordance with the present invention, a length of flexible tube, which may be thermoplastic, thermosetting, elastomeric, or a hybrid construction of an elastomer with a thermoplastic or thermosetting material, is formed in a predetermined three-dimensional serpentine configuration by a process wherein a thermoplastic preform tube is placed in a forming apparatus and a hot fluid at a temperature sufficient to soften the preform is forced into the tube under pressure. The hot fluid under pressure acts as a flexible mandrel to support the tube. The fluid-filled tube is mechanically manipulated by bending and forming members in the tube-forming apparatus to provide a tube having a predetermined three-dimensional serpentine configuration. Once the tube is formed in the desirable configuration, the hot fluid is replaced with a cooling fluid under pressure to set the shape of the tube in the predetermined three-dimensional serpentine configuration. Tubes manufactured in accordance with the invention have a consistent wall gauge and circular cross-section throughout their entire length without the difficulties associated with the manufacture of prior art tubes.

DETAILED DESCRIPTION OF THE INVENTION

Figure 1:
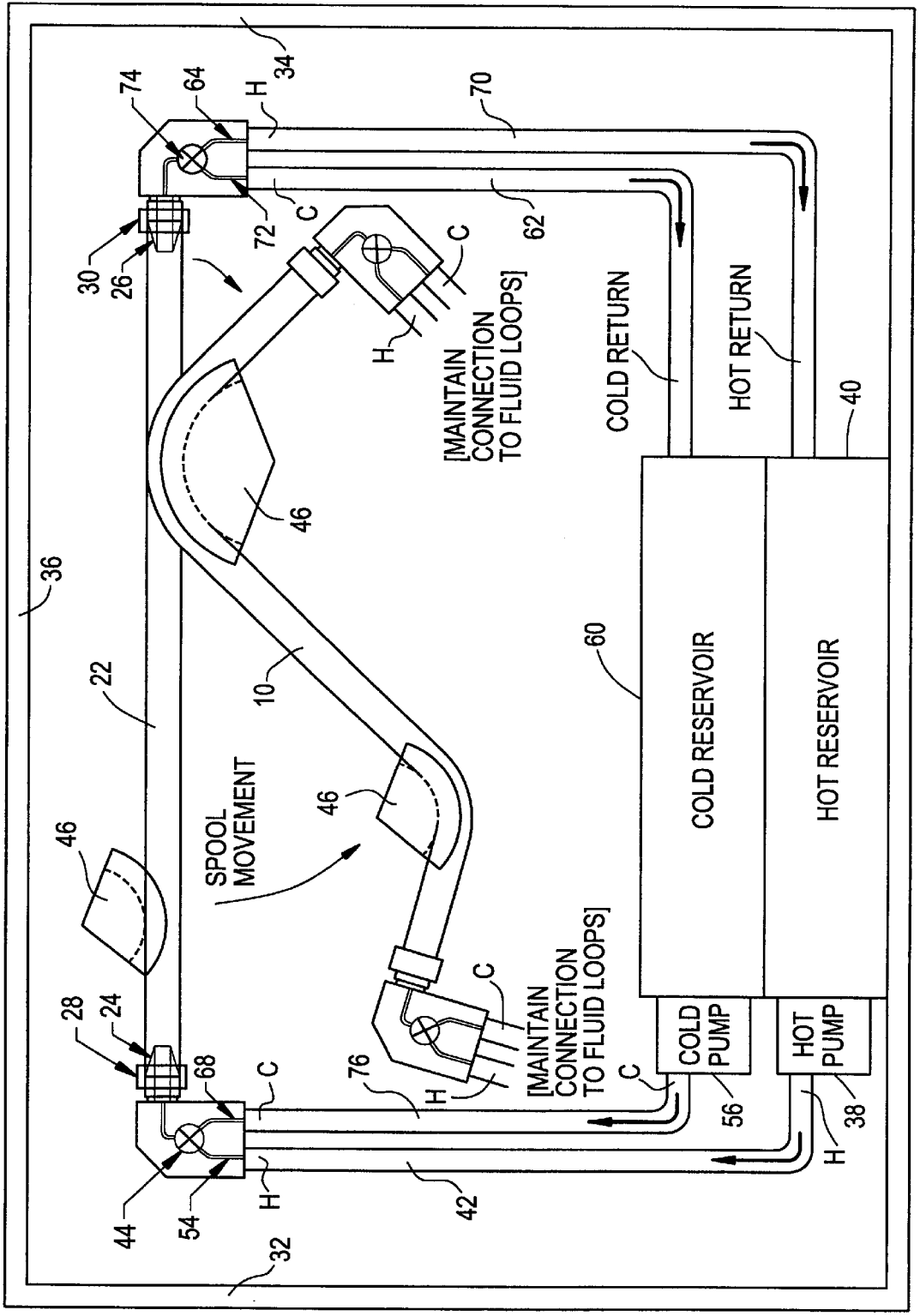
FIG. 1 is a top schematic diagram illustrating the formation of a three-dimensional serpentine tube of this invention.

The present invention relates to the manufacture of tubes which may be thermoplastic, thermosetting, elastomeric, or a hybrid construction containing an elastomer and a thermoplastic or thermosetting material, and particularly to the manufacture of large diameter thermoplastic tubes which may be used as fuel or vapor tubes in automobiles. Such tubes typically have a diameter of about 0.5 to 2.5 inches and are commonly employed as a conduit between the fuel inlet port and the fuel tank or other components. In order for the tube, which is coupled at one end to the fuel inlet port and at the other end to the fuel tank, to traverse the many structural members of the automobile such as a wheel well, suspension members, etc., the fuel tube may exhibit a three-dimensional serpentine configuration wherein some of the bends in the tube may be acute bends. Such tubes, while having some flexibility when formed, are somewhat rigid with respect to their final configuration.

In accordance with this invention, the present thermoplastic tubes are formed by extruding a tube having one or more layers and then mechanically shaping and bending the tube into a predetermined three-dimensional serpentine configuration by forcing a hot fluid at a temperature near the melting temperature for the material being processed into the tube under pressure; mechanically shaping and bending the tube to obtain the desired configuration; and then displacing the hot fluid with a cool fluid at a temperature sufficient to set the shape of the tube. After recovery of the cool fluid, the shaped tube is removed from the shaping apparatus and the process repeated with another length of extruded tubing. Not only is the production of the three-dimensional serpentine tube easily and efficiently accomplished, but the tube formed in accordance with the present invention exhibits highly desirable characteristics which were previously unattainable using prior art methods. For example, the three-dimensional serpentine tube of the present invention retains an inside circular cross-section which is uniform throughout the length of the tube even in the areas where acute bends are formed. Furthermore, the surface of the tube at the inner areas of bends are smooth, i.e., there is no visual detection of any ripples, creases or wrinkles even in areas of acute bends. Prior art tubes are notorious for being plagued with such ripples, creases and wrinkles in the inner surfaces of any bends formed in the tube. The ripples, creases and wrinkles create undesirable flow characteristics and lead to premature failure of the tube. The rippling, wrinkling and creasing in tubes has been a major problem in the production of curved tubes.

In one aspect of the invention, there is described a method for manufacturing a curved thermoplastic tube having a predetermined three-dimensional serpentine configuration wherein the tube exhibits a consistent wall gauge and circular cross-section uniformly throughout the length of the article, the method comprising: providing a formable thermoplastic tubular preform having one or more layers; securing the ends of the preform to respective coupling members such that the preform is longitudinally interposed between the coupling members, the coupling members being mounted on opposite members of a base such that elongational tension is capable of being placed on the preform; filling the hollow interior of the preform with a heated fluid at a pressure sufficient to support the preform; applying mechanical pressure to the fluid-containing preform at one or more specified locations on the exterior surface of the fluid-containing preform such that the preform is shaped into a predetermined configuration; replacing the heated fluid in the preform with a cooled fluid whereby the predetermined configuration of the preform is set; and removing the cooled fluid from the preform such that it is completely removed from the tube.

In a preferred aspect of the invention, there is described a method for manufacturing a two-layer thermoplastic tube having a predetermined three-dimensional serpentine configuration wherein the article exhibits a consistent circular cross-section of about 0.5 to 2.5 inches uniformly throughout the length of the article, the preferred method comprises: providing a formable thermoplastic tubular preform, having an inner tubular layer composed of a fluorothermoplastic material such as a fluorothermoplastic terpolymer comprising interpolymerized units derived from tetrafluoroethylene, hexafluoropropylene and vinylidene fluoride; and an outer tubular layer composed of a melt processable, polyamide selected from the group consisting of nylon-6, nylon-6.6, nylon-11 and nylon-12 which may be modified for increased adhesion or reinforcement. The inner layer typically has a thickness of about 0.004 to 0.010 inch, and the outer layer having a thickness of about 0.035 to 0.100 to provide a tubular wall thickness of about 0.030 to 0.100 inch;

preferably, the thickness of the inner layer is about 0.005 to 0.007 inch, and the thickness of the outer layer is about 0.45 inch; securing the ends of the preform to respective support members such that the preform is longitudinally interposed between the coupling members, the coupling members being tensionally mounted on opposite members of a base such that elongational tension is capable of being placed on the preform; filling the hollow interior of the preform with a heated fluid, the fluid being at a pressure sufficient to support the preform; applying mechanical pressure to the exterior surface of the fluid-containing preform at one or more spaced locations along its length and intermediate the ends of the fluid-containing preform with one or more spool elements, the spool elements having a grooved rim which conforms to the outer circumference of the preform, wherein the spool elements are capable of being independently actuated in the "X", "Y" and "Z" directions and axially rotated up to 90° so as to dispose the preform in a predetermined three-dimensional serpentine configuration while maintaining a consistent circular cross-section therein; replacing the heated fluid in the preform with a cooled fluid whereby the predetermined three-dimensional serpentine configuration of the preform is set; and removing the cooled fluid from the preform, the fluid being totally removed.

FIG. 1 illustrates the formation of a three-dimensional serpentine tubular article 10 according to the present invention. A tubular preform 22 may be provided by any customary method such as by co-extrusion or by separate extrusion with subsequent combination of the tubular layers. The ends of the preform 22 is secured to first and second coupling members 24 and 26 using clamps 28 and 30. The coupling members 24 and 26 may be resiliently or non-resiliently fixed to support arms 32 and 34, respectively, on a base structure 36. Heated fluid, maintained at an elevated temperature sufficient to soften the tubular preform 22 to a state where it is easily formable, is circulated by pump 38 from a reservoir 40 via conduit 42 through arm 54 of switching valve 44 in coupling member 24, and into the interior of the tubular preform 22, out through coupling member 26 and arm; 64 of switching valve 68 where it is then circulated through conduit 70 back to reservoir 40. The fluid is under pressure and supports tubular preform 22 in a manner similar to a support provided by a solid mandrel. The thus filled tubular preform 22 containing the heated fluid is softened by this heated fluid and made to conform to its desired, predetermined three-dimensional serpentine configuration by employing mechanical pressure provided by one or more spool elements 46, each of which is typically in the general shape of a wheel in which the edge defining the circumferential run of the wheel is a U-shaped structure, which conforms to the outer surface of tubular preform 22. Spool elements 46 are movably attached to the base structure 36 to take on the various attitudes and shapes to conform to the respective bends of the predetermined configuration. For example, spool element 46 may be actuated such as by an air actuated cylinder (not shown) to successively retract and extend spool element 46 into its proper and desired position. Clearly, shaping elements other than spools can be used in the invention, an additional example being a U-shaped saddle.

Once the malleable preform 22 is in the desired configuration, the heated fluid in tubular preform 22 is replaced by a cooled fluid circulated using pump 56 from reservoir 60 via conduit 76 through arm 68 of switching-valve 44 in coupling member 24 to set the tubular preform 22 at the predetermined configuration and provide the desired tubular article 10. The cooled fluid is removed from the interior of the tubular article 10 and returned to reservoir 60 through arm 72 of switching valve 74 and conduit 62. The procedure is then repeated using another tubular preform. The switching valve operates such that when corresponding areas are open to permit either the heated fluid or the cooled fluid to circulate through the system, the other respective arms are closed to minimize intermingling of the fluids.

Figure 2:
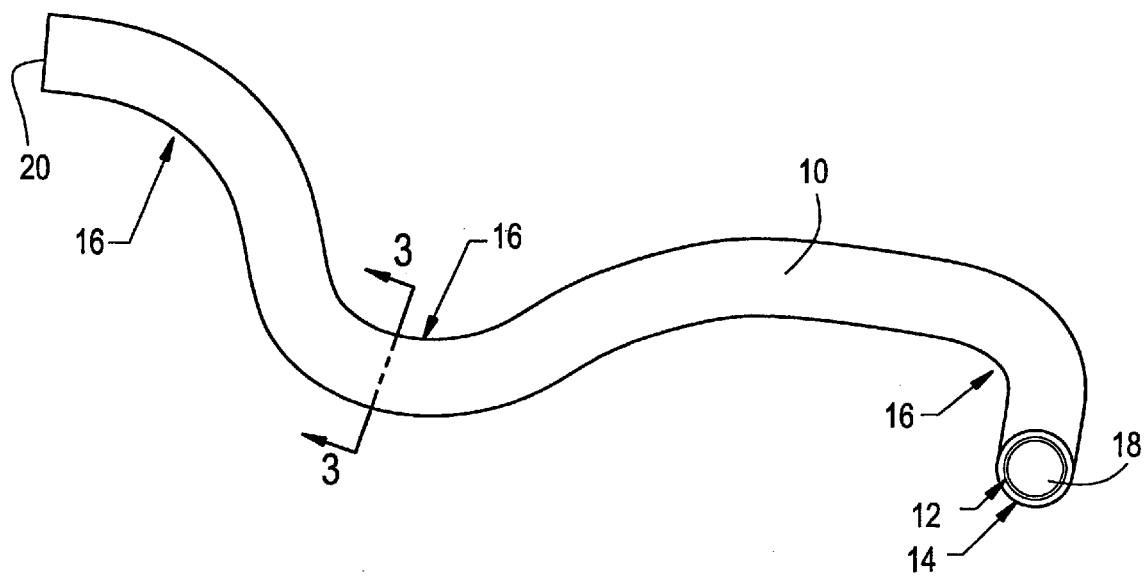
FIG. 2 is a perspective schematic view of a typical three-dimensional serpentine tube formed by the method of this invention.

FIG. 2 illustrates a three-dimensional serpentine tubular article 10 having an inner layer 12 and an outer layer 14 manufactured in accordance with the invention. The tubular article 10 is cylindrical in shape and is composed of an inner layer 12 surrounded by an outer layer 14. The interior surface of the inner layer defines a passageway for conveying fluids such as fuel when used as a fuel filler hose on a motor vehicle. The tubular article 10 contains one or more bends 16 to negotiate the distance between a fuel filler inlet and a fuel tank, and opposing open ends 18 and 20 which exhibit a circular cross-section.

Figure 3:
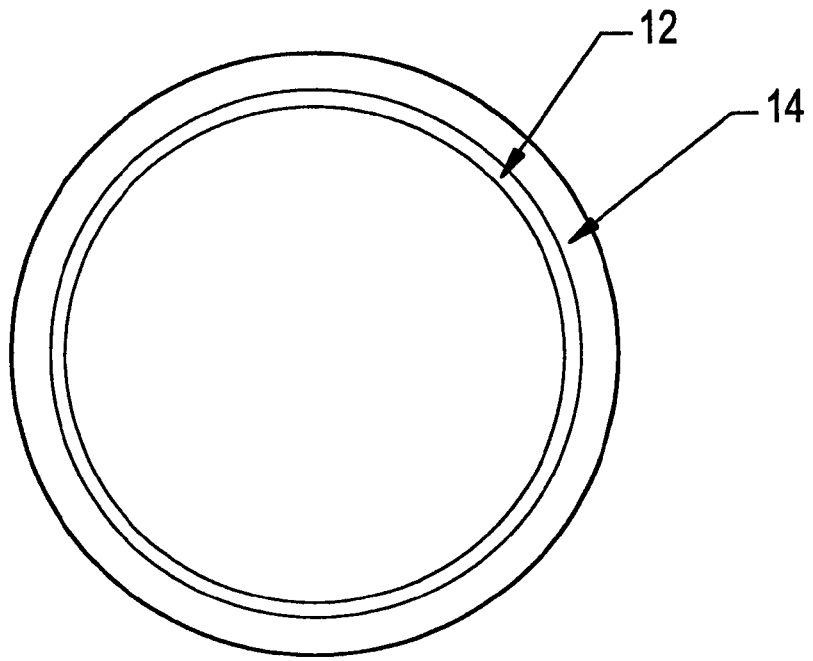
FIG. 3 is a cross sectional view taken along line 1—1 of a three-dimensional serpentine tube of the present invention.

FIG. 3 is a cross-sectional view of the three-dimensional serpentine tubular article of the invention illustrating that, in the areas of a bend, the tubular article exhibits a circular cross-section.

Figure 4:
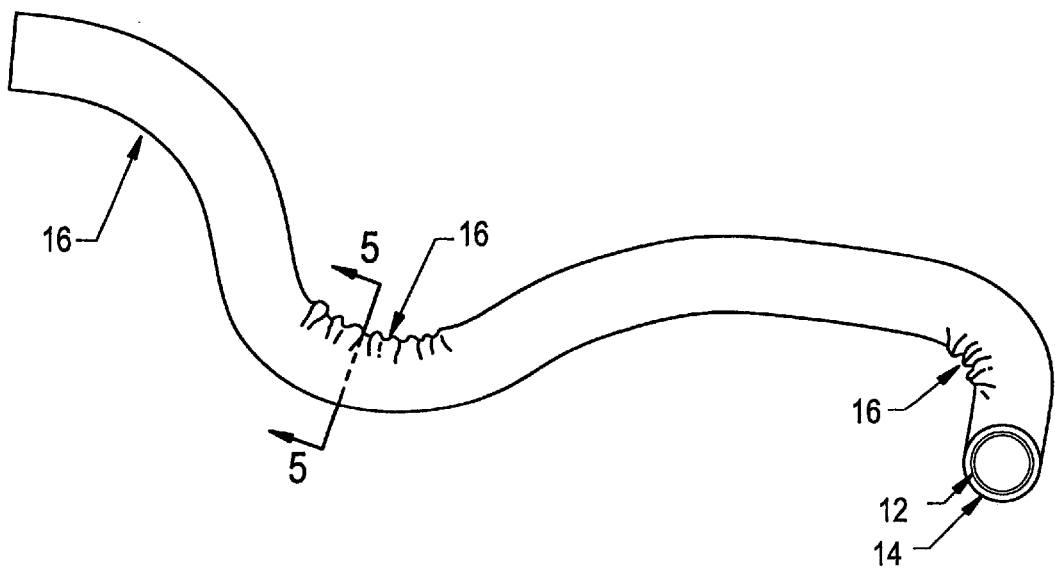
FIG. 4 is a perspective schematic view of a typical tube formed by the prior art.
Figure 5:
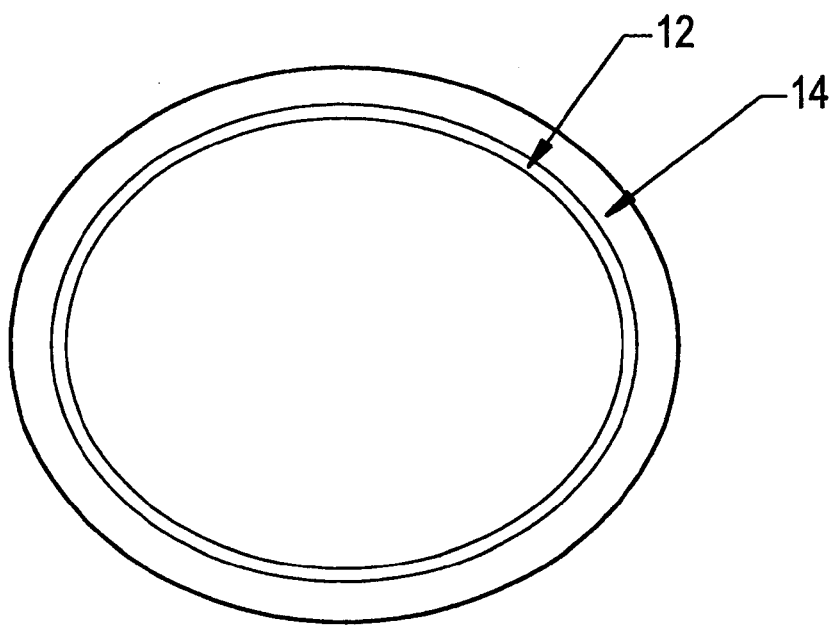
FIG. 5 is a cross sectional view taken along line 4—4 of a typical tube formed by the prior art.

FIG. 4 illustrates a three-dimensional serpentine tubular article of the prior art, and FIG. 5 is a cross-sectional view of the prior art three-dimensional serpentine tubular article illustrating that, in the area of a bend, the tubular article of the prior art exhibits a distorted opening which is oval in shape and, as seen in FIG. 4, the inner diameter of the bend has a wrinkled configuration.

The fluid used in the invention to support the tube during forming should be a material such as a polyoxyalkylene having an average molecular weight of about 200 to 600 and which is fluid at a temperature high enough to soften the tubular preform to a point where it is easily formable, and also fluid at a temperature cool enough to set the tubular article in the desired three-dimensional serpentine configuration; has no deleterious effect on the fluoropolymer inner layer; has low coefficient of expansion within the temperature range employed; and does not stick to the inner surface of the fluoropolymer layer whereby the wax can be easily removed from the tube without leaving contaminates on the inner surface of the tube. Polyethylene glycol available from International Wax under the name Carbowax 3350 has been found to be particularly useful as the fluid in carrying out the present invention. It is advantageous to use the same fluid to support the tube during both the heating stage to allow shaping of the tube to the desired configuration, and the cooling stage to set the configuration of the tube.

While the method of the present invention may be employed to manufacture tubes containing one or more layers of similar or dissimilar materials, it is preferably employed in the manufacture of tubes having a multi-layered construction and, most preferably, the method is employed in the manufacture of tubes having two layers of material in which the innermost layer is essentially impermeable with respect to hydrocarbon emissions and the outermost layer is essentially non-reactive with the external environment, i.e., it can withstand various shocks, vibrational fatigue, temperature changes and exposure to corrosive and degradative materials to which it would be exposed through the normal course of operation of a motor vehicle. Typically, the outer layer has a thickness which is greater than the thickness of the inner layer.

The tube should be suitable for use in the presence of hydrocarbons such as gasoline, gasahol, diesel fuel, etc. and any components which are normally associated with such hydrocarbons. The tube should perform effectively within a temperature environment of about 40° F. to 250° F. with operation at about −20° F. to 220° F. being preferred.

The method of the present invention is applicable to the manufacture of tubular structures having one or more layers and particularly to those tubular structures having two layers wherein the inner layer of the tube is composed of a thermoplastic or elastomer material. In the case of an elastomeric inner layer, any of the commonly used vulcanizing agents may be included and the elastomer is cured or vulcanized during the heating step of the present invention. Typically, the inner layer is a conductive thermoplastic fluoropolymer which exhibits excellent resistance in conventional gasoline fuel mixtures, e.g., alcohols, such as methanol and ethanol, peroxides, short chain hydrocarbons and the like; and the outer layer is a melt processable, extrudable thermoplastic, thermoset, elastomeric or hybrid polymer which is resistant to ultraviolet degradation, extreme temperature changes, exposure to environmental hazards such as zinc chloride, and degradation upon contact with engine fluids and oils.

Typically, the fluoropolymer is a terpolymer containing an alkylene fluoropolymer, polymer made from a fluoro-olefin monomer or monomers, and a vinyl fluoride monomer or polymer. Preferably, the inner layer of the tube is a terpolymer of tetrafluoroethylene, hexafluoropropylene, and vinylidene fluoride. A fluoroterpolymer found to be particularly useful in the present invention is commercially available from Dyneon under the name Dyneon THV.

Typically, the inner layer is made conductive in liquid fuel tubes and non-conductive in vapor return tubes. The inner layer of liquid fuel tubes, as is common practice in the industry, is made conductive to prevent the buildup of static electricity generated by the flow of fuel along the inner surface of the tube. The fluoropolymer is made conductive by incorporating therein a suitable material of a composition and shape capable of effecting static dissipation such as carbon, e.g., carbon black; stainless steel; higher conductive metals such as copper, silver, gold, nickel, silicon; organo-metals such as organo zirconates and organo titanates; and mixtures thereof. Preferably, the conductive material is carbon black. While the amount of carbon black is not particularly critical, excess carbon black, i.e., amounts greater than about 5%, tends to make material difficult to process. Conductive materials such as carbon black tends to reduce or prevent the THV from adhering to other materials normally used to form adjacent layers.

The outer layer is a polymeric material to which the inner layer can securely adhere. More precisely, the polymeric outer layer is a melt processable thermoplastic, thermoset, elastomeric or hybrid polymer selected from the group consisting of polyamide, polyamide, polyurethane, high density polyethylene, ultra high density polyethylene (UHDPE), chlorinated polyethylene, polychloromethoxirane, chlorinated butyl rubber, chloroprene, chlorosulfonopolyethylene, ethylene oxide terpolymers of ethylenepropylenediene, copolymers of ethylenepropylene, polysulfide, polyphenolsulfide, polysulfones, isobutene-isoprene resins, polybutadiene, nitrile-butadiene polymers, styrenebutadiene rubber (SBR), thermoplastic vulcanizates (TPV) thermoplastic olefines (TAO), fluoroelastomer rubber (FKM), vinylethylene acrylic rubber, epichlorohydrin rubber, polyvinyl chloride, ethylene propylene copolymers, or a carboxyl, anhydride, or imide functional polyolefin. Polyamides such as nylons, e.g., nylon-6, nylon-6.6, nylon-11, nylon-12, and nylon-21, when compounded with a di- or polyamine, are particularly useful as the outer layer of the invention. The preparation of di- or polyamine-containing non-fluorinated polymers is disclosed in U.S. Pat. No. 5,658,670 to Minnesota Mining and Manufacturing Company, the contents of which is incorporated herein by reference.

Various modifications and alterations will be apparent to those skilled in the art without departing from the scope and spirit of the invention, and it is not intended that this invention be restricted to that set forth herein for illustrative purposes.

What is claimed is:

1. A method for manufacturing a curved tubular article wherein said tubular article is composed of a thermoplastic, thermosetting, elastomeric, or a hybrid construction of an elastomer and a thermoplastic or thermosetting material, said tubular article having a predetermined three-dimensional serpentine configuration wherein said article exhibits a consistent wall gauge and circular cross-section uniformly throughout the length of said article, said method comprising:

providing a formable tubular preform wherein said tubular preform is composed of a thermoplastic, thermosetting, elastomeric, or a hybrid construction of an elastomer and a thermoplastic or thermosetting material;

securing the ends of said preform to respective coupling members such that said preform is longitudinally interposed between said coupling members, said coupling members being mounted on opposite sides of a base such that elongational tension is capable of being placed on said preform;

filling the hollow interior of said preform with a first fluid at a temperature high enough to soften said preform to a point where it is formable, said fluid being at a pressure sufficient to support said preform;

applying mechanical pressure to the fluid-containing preform at one or more specified locations on the exterior surface of said fluid-containing preform such that said preform is shaped into a predetermined configuration;

replacing the first fluid in said preform with a second fluid at a temperature cool enough to set said preform in the desired configuration whereby the predetermined configuration of said preform is set; and removing said second fluid from said preform, said fluid being totally removed.

2. The method of claim 1 wherein said first fluid and said second fluid are of the same composition, said composition being polyethylene glycol.

3. The method of claim 1 wherein said first fluid is at a temperature up to 370° F.

4. The method of claim 1 wherein said pressure sufficient to support said preform is about 15 to 20 psig.

5. The method of claim 1 wherein said second fluid is at a temperature of about 30 to 35° F.

6. The method of claim 1 wherein said curved tubular article is an automobile fuel filler tube having a circular cross-section of about 0.5 to 2.5 inches.

7. The method of claim 1 wherein said preform is a multi-layer structure comprising an inner tubular layer composed of a thermoplastic or elastomeric fluoropolymer and an outer tubular layer composed of a melt processable thermoplastic, thermoset, elastomeric or hybrid polymer selected from the group consisting of polyamide; polyimide; polyurethane; a carboxyl, anhydride or imide functional polyolefin; high density polyolefin; ultra high density polyolefin; chlorinated polyethylene; polychloromethoxirane;

chlorinated butyl rubber; chloroprene; chlorosulfonopolyethylene; ethylene oxide terpolymers of ethylenepropylenediene; copolymers of ethylenepropylene; polysulfide; polyphenolsulfide; polysulfones; isobutylene-isoprene resins; polybutadiene; nitrile-butadiene polymers; styrene-butadiene rubber; thermoplastic vulcanizates; thermoplastic olefins; fluoroelastomers; vinylethylene acrylic rubber; epichlorohydrin rubber; polyvinyl chloride and ethylene propylene copolymers.

8. The method of claim 7 wherein said preform is a two layer tubular structure comprising an inner tubular layer composed of an extrudable, conductive, fluorothermoplastic terpolymer comprising interpolyerized units derived from tetrafluoroethylene, hexafluoropropylene and vinylidine fluoride, and an outer tubular layer of a melt processable, di- or polyamine-modified polyamide selected from the group consisting of nylon-6, nylon-6.6, nylon-11 and nylon-12, said outer layer having a thickness which is greater than the thickness of said inner layer.

9. The method of claim 8 wherein said conductive fluorothermoplastic terpolymer contains up to about 5% by weight of a conductive material selected from the group consisting of carbon black, copper, silver, gold, nickel, silicon, organo titanate, organo-zirconate and mixtures thereof.

10. The method of claim 9 wherein said conductive material is carbon black.

11. The method of claim 8 wherein said inner layer has a thickness of about 0.004 to 0.008 inch and said outer layer has a thickness of about 0.044 to 0.047 inch.

12. The method of claim 1 wherein the step of applying said mechanical pressure to the fluid-containing preform comprises tangentially contacting said preform at said one or more specified locations along its length and intermediate the ends of said fluid-containing preform with one or more spool elements, said spool elements having a grooved rim which conforms to the outer circumference of said preform, wherein said spool elements are capable of being independently actuated in the "X", "Y" and "Z" directions and axially rotated up to 90° so as to dispose said preform in a predetermined three-dimensional serpentine configuration while maintaining a consistent circular cross-section therein.

13. A method for manufacturing a thermoplastic tube having a predetermined three-dimensional serpentine configuration wherein said thermoplastic tube exhibits a circular cross-section of about 0.5 to 2.5 inches uniformly throughout the length of said thermoplastic tube, said method comprising:

providing a formable thermoplastic tubular preform, said preform comprising an inner tubular layer composed of an extrudable, conductive, fluorothermoplastic terpolymer comprising interpolymerized units derived from tetrafluoroethylene, hexafluoropropylene and vinylidine fluoride, and an outer tubular layer composed of a melt processable, di- or polyamine-modified polyamide selected from the group consisting of nylon-6, nylon-6.6, nylon-11 and nylon-12, said inner layer having a thickness of about 0.004 to 0.008 inch and said outer layer having a thickness of about 0.045 to 0.047 inch;

securing the ends of said preform to respective support members such that said preform is longitudinally interposed between said coupling members, said coupling members being tensionally mounted on opposite sides of a base such that elongational tension is capable of being placed on said preform;

filling the hollow interior of said preform with a first fluid, said fluid being at a temperature high enough to soften said tubular preform to a point where it is formable and at an elevated pressure sufficient to support said preform;

applying mechanical pressure to the exterior surface of the fluid-containing preform at one or more spaced locations along its length and intermediate the ends of said fluid-containing preform with one or more spool elements, said spool elements having a grooved rim which confirms to the outer circumference of said preform, wherein said spool elements are capable of being independently actuated in the "X", "Y" and "Z" directions and axially rotated up to 90° so as to dispose said preform in a predetermined three-dimensional serpentine configuration while maintaining a consistent circular cross-section therein;

replacing the heated fluid in said preform with a second fluid at a temperature cool enough to set said preform in the desired three-dimensional serpentine configuration, whereby the predetermined configuration of said preform is set; and removing said second fluid from said preform, said fluid being totally removed.

14. A method for manufacturing a curved tubular article wherein said tubular article is composed of a thermoplastic, thermosetting, elastomeric, or a hybrid construction of an elastomer and a thermoplastic or thermosetting material, said tubular article having a predetermined three-dimensional serpentine configuration wherein said article exhibits a consistent wall gauge and a circular cross-section uniformly throughout the length of said article, said method comprising:

providing a formable tubular preform wherein said preform is a multi-layer structure comprising an inner tubular layer composed of an extrudable, conductive, fluorothermoplastic terpolymer comprising interpolymerized units derived from tetra fluoroethylene, hexafluoropropylene and vinylidine fluoride, and an outer tubular layer of a melt processible thermoplastic, thermoset, elastomeric or hybrid polymer selected from the group consisting of polyamide; polyimide; polyurethane; a carboxyl, anhydride or imide functional polyolefin; high density polyolefin; ultra high density polyolefin; chlorinated polyethylene; polychloromethoxirane; chlorinated butyl rubber; clhoroprene; chlorosulfonopolyethylene; ethylene oxide terpolymers of ethylenepropylenediene; copolymers of ethylene propylene; polysulfide; polyphenolsulfide; polysulfones; isobutylene-isoprene resins; polybutadiene; nitrile-butadiene polymers; styrene-butadiene rubber; thermoplastic vulcanizates; thermoplastic olefins; fluoroelastomers; vinylethylene acrylic rubber; epichlorohydrin rubber; polyvinyl chloride and ethylene propylene copolymers;

securing the ends of said preform to respective coupling members such that said preform is longitudinally interposed between said coupling members, said coupling members being mounted on opposite side of a base such that longitudinal tension is capable of being placed on said preform;

filling the hollow interior of said preform with a first fluid heated at a temperature high enough to soften said preform to a point where it is formable, said first fluid being at a pressure sufficient to support said preform;

applying mechanical pressure to one or more specified locations on the exterior surface of said softened preform containing said first fluid such that said preform is shaped into a predetermined configuration;

replacing the first fluid in said preform with a second fluid at a temperature cool enough to set said preform in the desired configuration whereby the predetermined configuration of said preform is set; and removing said second fluid from said set preform, said fluid being totally removed.

15. A method for manufacturing a curved tubular article wherein said tubular article is composed of a thermoplastic, thermosetting, elastomeric, or a hybrid construction of an elastomer and a thermoplastic or thermosetting material, said tubular article having a predetermined three-dimensional serpentine configuration wherein said article exhibits a consistent wall gauge and a circular cross-section uniformly throughout the length of said article, said method comprising:

providing a formable tubular preform wherein said preform is a multi-layer structure comprising an inner tubular layer composed of an extrudable, conductive, fluorothermoplastic terpolymer comprising interpoilymerized units derived from tetrafluoroethylene, hexafluoropropylene and vinylidine fluoride, and an outer tubular layer of a melt processable thermoplastic, thermoset, elastomeric or hybrid polymer selected from the group consisting of polyamide; polyimide; polyurethane; a carboxyl, anhydride or imide functional polyolefin; high density polyolefin; ultra high density polyolefin; chlorinated polyethylene; polychloromethoxirane; chlorinated butyl rubber; chloroprene; chlorosulfonopolyethylene; ethylene oxide terpolymers of ethylenepropylenediene; copolymers of ethylene propylene; polysulfide; polyphenolsulfide; polysulfones; isobutylene-isoropene resins; polybutadiene; nitrile-butadiene polymers; styrene-butadiene rubber; thermoplastic vulcanizates; thermoplastic olefins; fluoroelastomers, vinylethylene acrylic rubber; epichlorohydrin rubber; polyvinyl chloride and ethylene propylene copolymers;

securing the ends of said preform to respective coupling members such that said preform is longitudinally interposed between said coupling members, said coupling members being mounted on opposite side of a base such that elongational tension is capable of being placed on said preform;

filling the hollow interior of said preform with a first fluid heated to a temperature high enough to soften said preform to a point where it is formable, said first fluid being at a pressure sufficient to support said preform;

applying mechanical pressure to specified locations along said softened preform containing said first fluid wherein one or more spool elements tangentially contact said softened preform at said specified locations along the length and intermediate the end of said preform, said sool elements having a grooved rim which conforms to the outer circumference of said preform, wherein said spool elements are capable of being independently actuated in the "X", "Y", and "Z" directions and axially rotated up to about 90° so as to dispose said preform in a predetermined three-dimensional serpentine configuration while maintaining a consistent circular cross-section therein;

replacing the first fluid in said preform with a second fluid at a temperature cool enough to set said preform in the desired configuration whereby the predetermined configuration of said preform is set; and removing said second fluid from said preform, said second fluid being totally removed.

* * * * *